United States Patent [19]
Soucie et al.

[11] Patent Number: 5,467,666
[45] Date of Patent: Nov. 21, 1995

[54] NON-JAMMING SELF-ADJUST PAWL AND RATCHET MECHANISM

[75] Inventors: Wayne L. Soucie, Columbia; Larry B. Champ, Cairo; Jeffrey E. Tayon, Moberly; Harold L. Carlson, Moberly; Steven W. Marek, Moberly; Peter C. Koenig, Moberly, all of Mo.

[73] Assignee: Dura Automotive Systems, Inc., Troy, Mich.

[21] Appl. No.: 271,723

[22] Filed: Jul. 7, 1994

[51] Int. Cl.$^6$ .................. C22B 9/00; C21C 7/10
[52] U.S. Cl. .................. 74/575; 74/512; 74/528; 74/537; 74/538; 74/539; 74/577 R; 74/577 M; 74/542
[58] Field of Search .................. 74/512, 513, 575, 74/576, 577 R, 577 S, 577 SF, 577 M, 578, 528–531, 533, 535–539, 540, 541, 543, 542, 536, 501.5 R, 501.6, 545

[56] References Cited

U.S. PATENT DOCUMENTS

| | | | |
|---|---|---|---|
| 3,408,879 | 11/1968 | Modder et al. | 74/575 X |
| 4,127,042 | 11/1978 | Lipshield | 74/537 X |
| 4,441,380 | 4/1984 | Kawaguchi et al. | 74/529 X |
| 4,819,501 | 4/1989 | Kraus et al. | 74/538 |
| 4,841,798 | 6/1989 | Porter et al. | 74/512 X |
| 4,850,242 | 7/1989 | Hass et al. | 74/531 X |
| 4,872,368 | 10/1989 | Porter | 74/512 |
| 5,054,333 | 10/1991 | Scott et al. | 74/539 X |
| 5,131,288 | 7/1992 | Barlas | 74/512 |
| 5,211,072 | 5/1993 | Barlas et al. | 74/512 |
| 5,235,867 | 8/1993 | Wortmann et al. | 74/512 |
| 5,247,850 | 9/1993 | Lenzke | 74/575 X |
| 5,280,734 | 1/1994 | Riffle et al. | 74/529 |
| 5,303,610 | 4/1994 | Noel et al. | 74/528 X |

FOREIGN PATENT DOCUMENTS

| | | | |
|---|---|---|---|
| 2583362 | 12/1986 | France | 74/528 |
| 4023876 | 1/1992 | Germany | 74/512 |
| 61-218461 | 9/1986 | Japan | 74/528 |
| 2-249746 | 10/1990 | Japan | 74/575 |
| 3-227759 | 10/1991 | Japan | 74/512 |
| 3-284456 | 12/1991 | Japan | 74/512 |

*Primary Examiner*—Vinh T. Luong
*Attorney, Agent, or Firm*—Laubscher & Laubscher

[57] ABSTRACT

An improved non-jamming self-adjust pawl and ratchet mechanism for use in an automotive parking brake system or the like, includes cam-out and cam-in devices that are spaced to define an overlap dwell distance to insure suitable engagement between the adjuster pawl and the adjuster ratchet as a foot or hand brake operating lever is pivoted from a brake disengaged position toward a brake fully-engaged position. In the case of the foot-operated lever, the spacing distance between the cam-out and cam-in devices is greater than the bounce-back travel distance of the lever upon the removal of cable tension load thereon.

10 Claims, 7 Drawing Sheets

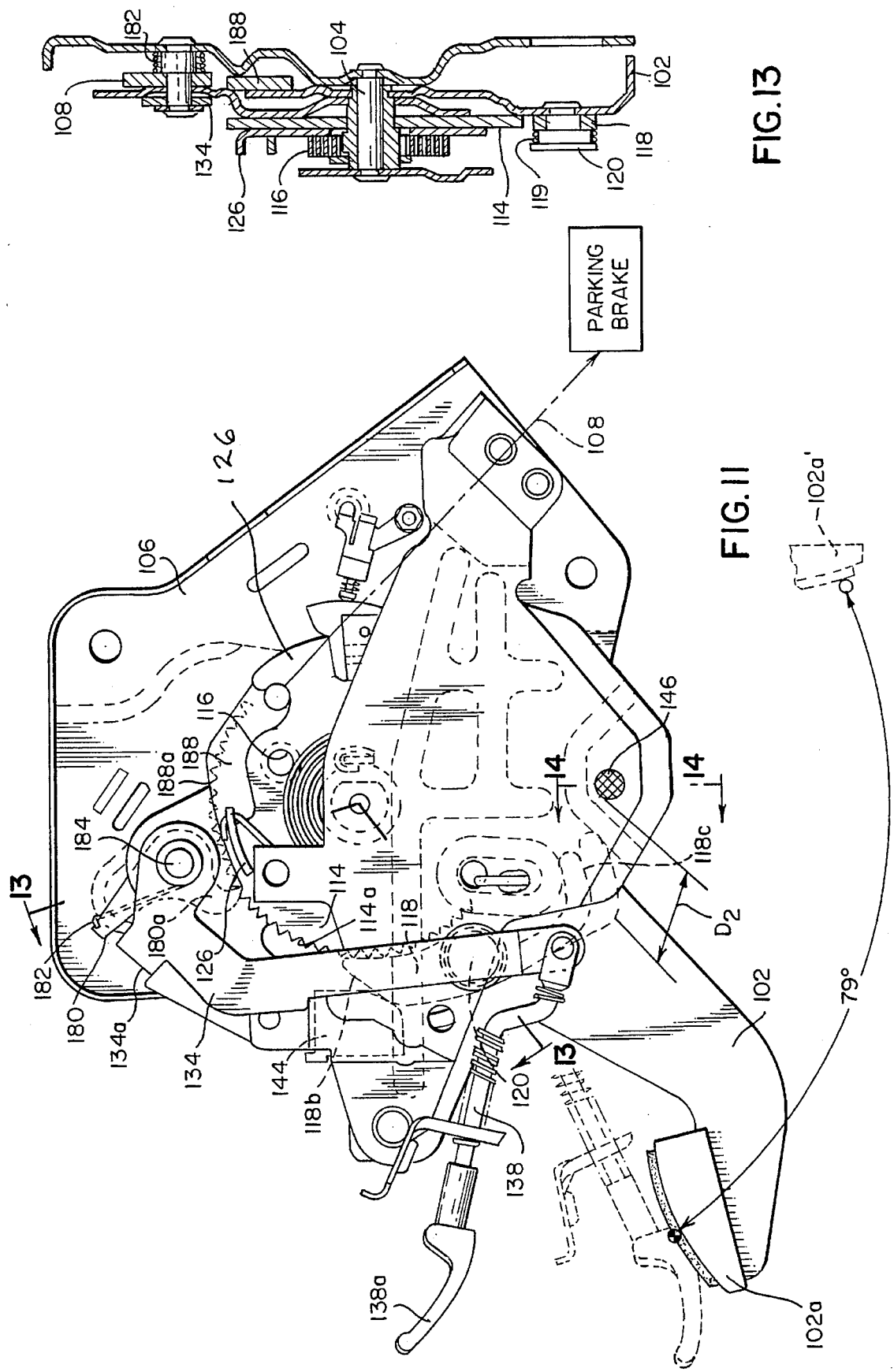

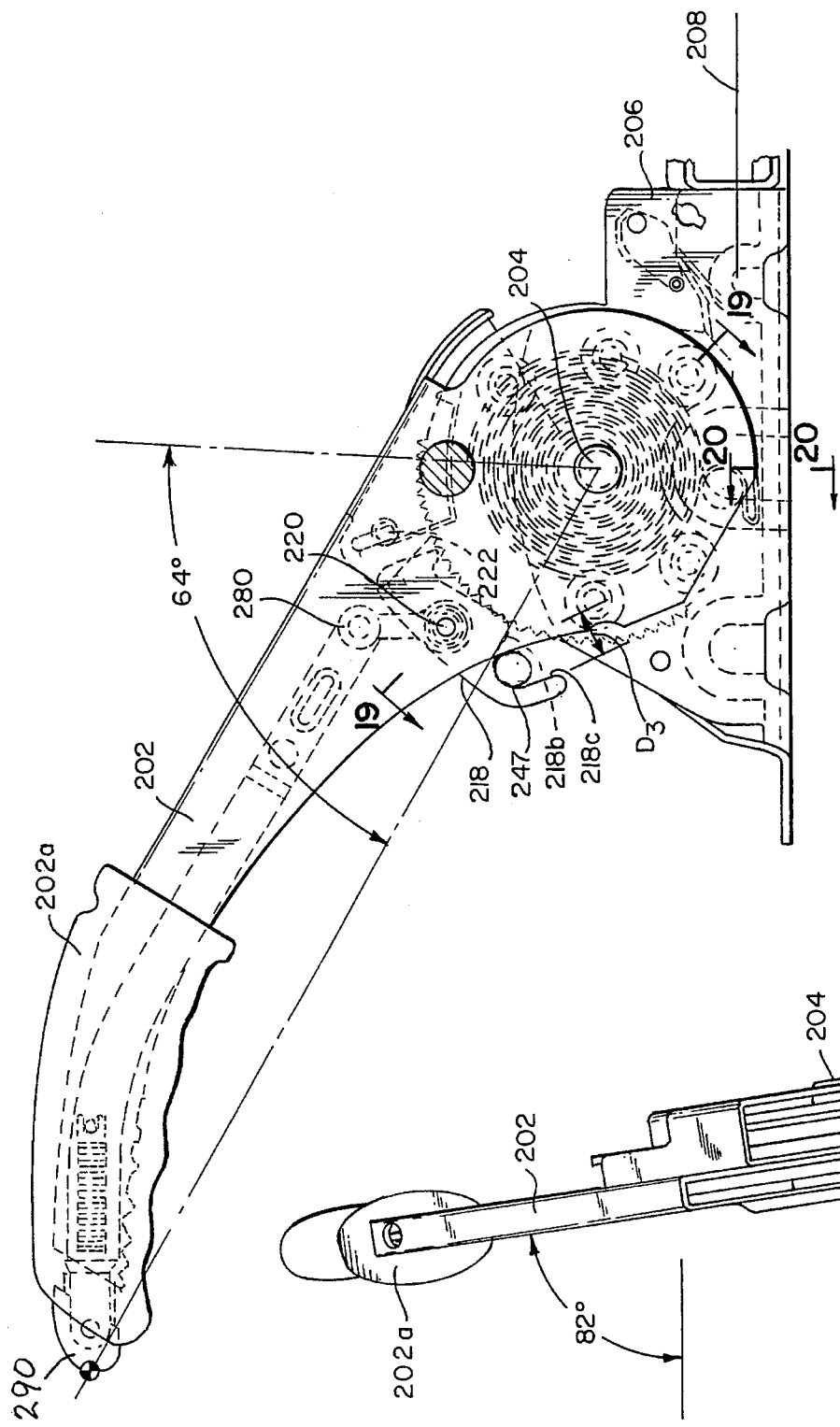

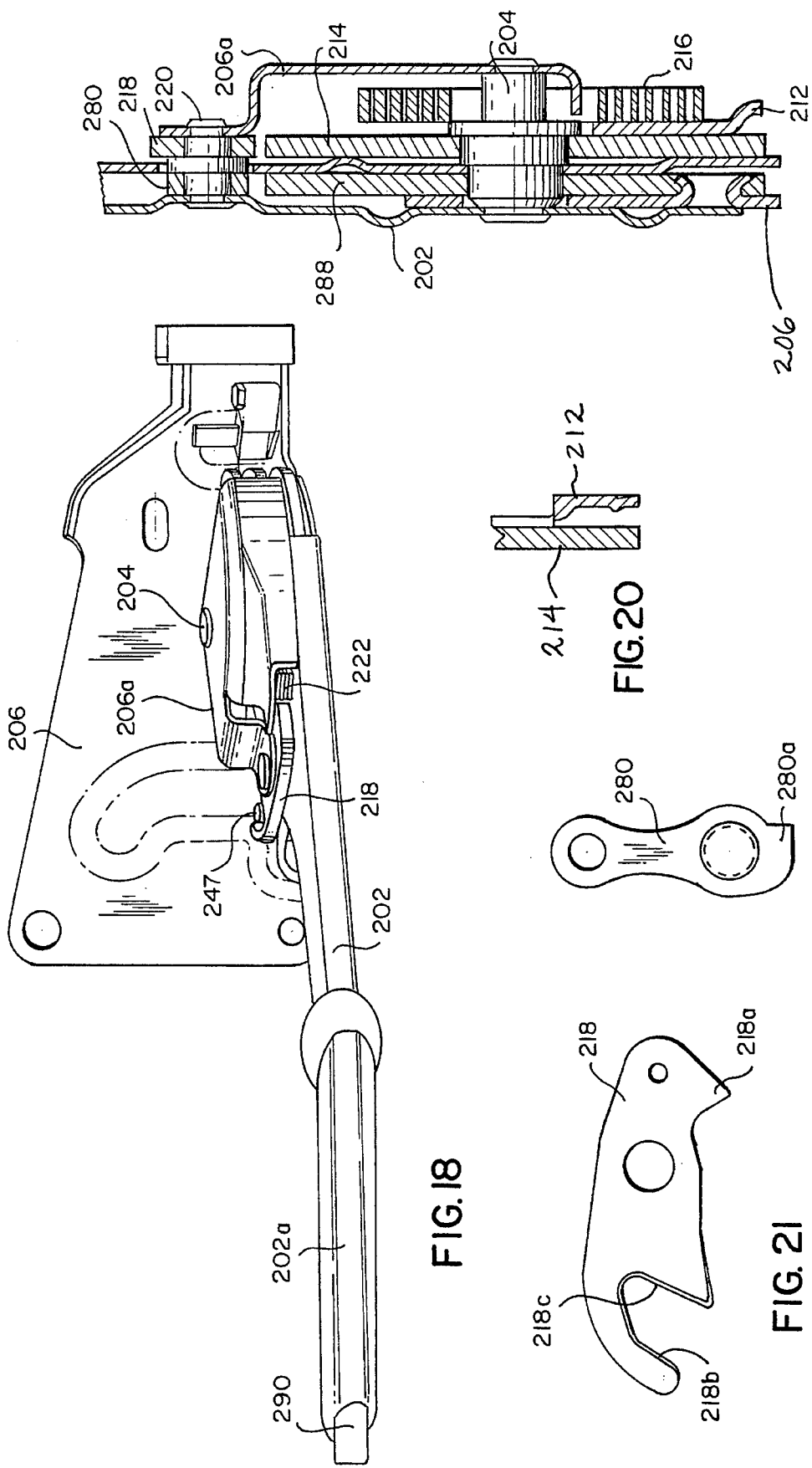

NON-JAMMING SELF-ADJUST PAWL AND RATCHET MECHANISM

STATEMENT OF THE INVENTION

An improved non-jamming self-adjust pawl and ratchet mechanism is disclosed for use in an automotive parking brake system or the like, including cam-out and cam-in means that are spaced to define an overlap dwell distance for insuring positive suitable engagement between the adjuster pawl and the adjuster ratchet as a foot or hand brake operating lever is pivoted toward a brake fully-engaged position.

BRIEF DESCRIPTION OF THE PRIOR ART

It is known in the prior art to provide a parking brake system including self-adjust means for automatically disengaging the brake cable guide track from the operating lever when the lever is in the brake released position, thereby to remove slack from the cable. Examples of such self-adjust systems are shown in the patents to Porter et al U.S. Pat. No. 4,841,798, Porter U.S. Pat. No. 4,872,368 and Wortmann et al U.S. Pat. No. 5,235,867, each assigned to the same assignee as the instant invention. In order to disengage the cable guide track from the operating lever, it is customary to provide a cam-out pin or abutment on the housing for disengaging an adjuster pawl from an adjuster ratchet when the operating lever is in the brake-off position. When the operating lever is again pivoted in the brake-engaging direction, the spring-biased adjuster pawl is pivoted toward the adjuster ratchet, thereby presenting the possibilities of full tooth engagement, partial tooth engagement (either on the front or rear edges of the associated ratchet tooth), or undesirable top-to-top contact between the teeth, which might lend to a jamming or locking-up of the parking brake mechanism.

The present invention was developed to provide an improved parking brake mechanism for positively eliminating the top-to-top or partial-engagement conditions and for achieving full engagement between the pawl and ratchet teeth.

SUMMARY OF THE INVENTION

Accordingly, a primary object of the present invention is to provide an improved parking brake mechanism of the self-adjust cable-slack-removing type, wherein cam-out means serve to disengage the adjuster pawl from the adjuster ratchet when the operating lever is in the brake fully-released position, and cam-in means are operable to displace the adjuster pawl toward full engagement with the ratchet as the operating lever is pivoted toward the brake fully-applied position, the spacing distance between the cam-out and cam-in means being such as to provide a dwell overlap space between at least the top-off point of lever travel and the initial cam-in point, and preferably between the maximum bounce-back point of lever travel and the initial cam-in point.

In a first embodiment, the parking brake mechanism includes a foot-operated lever that is maintained in the brake-engaged position by clutch spring and gear drum means, the self-adjust cable tension removing means including a pair of cam-out and cam-in pins mounted in spaced relation on the housing, the spacing distance between the pins being such that a dwell overlap space is defined before the adjust pawl engages the cam-in pin, whereby the progressively increasing cable tension reacts together with the adjuster pawl spring relative to the opposing force vectors to assure that the adjuster pawl tooth is in a self-engaging position on the associated ratchet tooth.

In a second embodiment, the foot-lever operating means is maintained in the brake-engaged position by main pawl and main ratchet means. Again, a pair of critically spaced cam-out and cam-in pins are used to effect positive operation of the adjuster pawl relative to the adjuster ratchet.

In a third embodiment, the operating lever is a hand lever that carries the adjuster pawl, a single cam pin being mounted on the housing for reaction between opposed spaced cam-out and cam-in surfaces on the adjuster pawl, the cam-in and cam-out surfaces being so spaced relative to the pin as to provide a dwell overlap distance between the top-off point of travel and the initial cam-in point.

The design of the present invention affords positive re-engagement between the adjuster pawl and ratchet in three ways, namely, by providing additional force via pedal force to break the tip-on-tip equilibrium; by providing a sufficient tooth engagement of the self-adjuster ratchet tooth and the self-adjust pawl that will sustain full system load and the cam-in pin is located in a position to provide proper adjustment function. Sixteen levers were tested in life cycle evaluation. The longest duration test was 125,000 cycles, the minimum duration being 32,106 cycles. Successful cam-in operation of the adjuster pawl was achieved on each occasion. The present invention offers the advantages that tooling modifications can be accomplished with minimum impact on production tooling and assembly processes. Component changes maintain the basic design strength and function of other components in the assembly. Minimal change to normal plant or procedures is required. The auto adjust function is maintained over the life expectancy of the component.

BRIEF DESCRIPTION OF THE DRAWINGS

Other objects and advantages of the invention will become Other apparent from a study of the following specification, when viewed in the light of the accompanying drawings, in which:

FIGS. 11 and 12 are right side elevational and left hand end views, respectively, of a second foot lever operated embodiment of the invention;

FIGS. 13 and 14 are sectional views taken along lines 13—13 and 14—14 of FIG. 11, respectively;

FIGS. 16–18 are right side elevational, right end and top plan views, respectively, of a hand-lever parking brake embodiment of the invention;

FIGS. 19 and 20 are sectional views taken along lines 19—19 and 20—20, respectively, of FIG. 16; and FIGS. 21 and 22 are side elevational views (respectively,) of the adjuster and main pawls, respectively, of FIG. 16.

DETAILED DESCRIPTION

Figure 1:
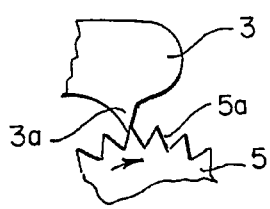
FIGS. 1–4 are diagrammatic views illustrating the adjuster pawl and ratchet means in the back-side tip-on-tip, top-on-top, front-side tip-on-tip, and fully engaged conditions, respectively.
Figure 2:
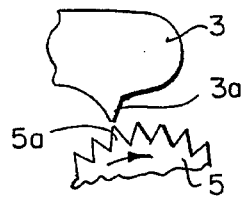
Figure 3:
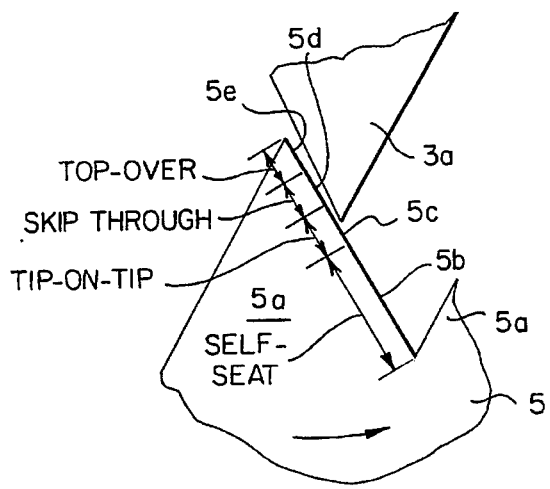
Figure 4:
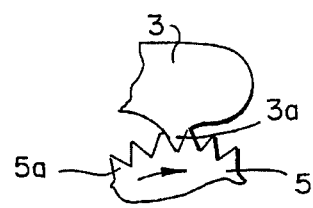

Referring first more particularly to FIGS. 1–4, the adjuster pawl 3 of a self-adjust parking brake system includes a pawl tooth 3a that is adapted to engage the teeth 5a of adjuster ratchet 5. In FIG. 1 the pawl tooth 3a is in frictional partial engagement with the rear edge of a ratchet tooth 5a in a load-carrying condition, and FIG. 2 shows the pawl and ratchet teeth in an undesirable top-on-top non-load carrying condition. FIG. 3 illustrates the pawl tooth 3a in frictional partial engagement with the front edge of the ratchet tooth 5a. In this enlarged view, the self-seat, tip-on-tip, skip-through and top-over portions 5b, 5c, 5d and 5e, respectively, of the front side edge of the ratchet teeth are identified, similar portions being contained on the rear side edges of the ratchet teeth. FIG. 4 illustrates the pawl tooth in the preferred fully-engaged condition relative to the ratchet teeth.

Referring now to FIGS. 5–8, the parking brake arrangement is of the automatic cable-slack removing self-adjust type including a foot pedal lever 2 pivotally connected by pivot pin 4 with a housing 6 for operating the parking brake cable 8 via automatically operable cable slack removing means 10. The cable slack removing means includes a cable tract member 12 secured to an adjuster ratchet 14 that rotates freely about pivot axis 4, which adjuster ratchet is biased in the counterclockwise cable slack removing direction by spiral adjuster spring 16 mounted concentrically about pivot shaft 4. Adjuster pawl 18, which is pivotally connected with foot lever 2 by pivot pin 20, has a pawl tooth 18a that is normally biased into engagement with the ratchet teeth 14a by pawl spring 22 (which biases the adjuster pawl in the counterclockwise direction relative to lever 2).

Sector gear 26 is secured to foot pedal 2 for cooperation with the teeth 28a of a gear drum 28 the outer periphery of which is in concentric engagement with the inner surfaces of the turns of helical clutch spring 30. One end 30a of the helical clutch spring is clamped to the housing 6, while the other end 30b of the clutch spring is arranged for engagement by the release end 34a of the release lever 34 that is pivotally connected by pivot pin 36 with housing 6, and is pivoted in the clockwise parking brake release direction by release lever 38 that is biased by spring 40 toward the spring-clutch-engaged position.

According to a characterizing feature of the invention, the self-adjust cable slack removing means 10 further includes stationary cam-out pin means 44 for disengaging the adjuster pawl 18 from the adjuster ratchet 14, and stationary cam-in pin means 46 for assuring deep-seated full engagement between the adjuster pawl tooth 18a and ratchet teeth 14a (corresponding with the fully-engaged condition of FIG. 4) as the foot pedal lever 2 is depressed toward the parking brake fully-engaged condition. As will be developed below, the spacing distance between the stationary cam-out and cam-in pins—which are each secured to the housing 6—is critical. The cam-out pin also functions as the resilient bumper for stopping pivotal movement of the foot lever 2 in the brake-releasing direction.

OPERATION

Figure 9:
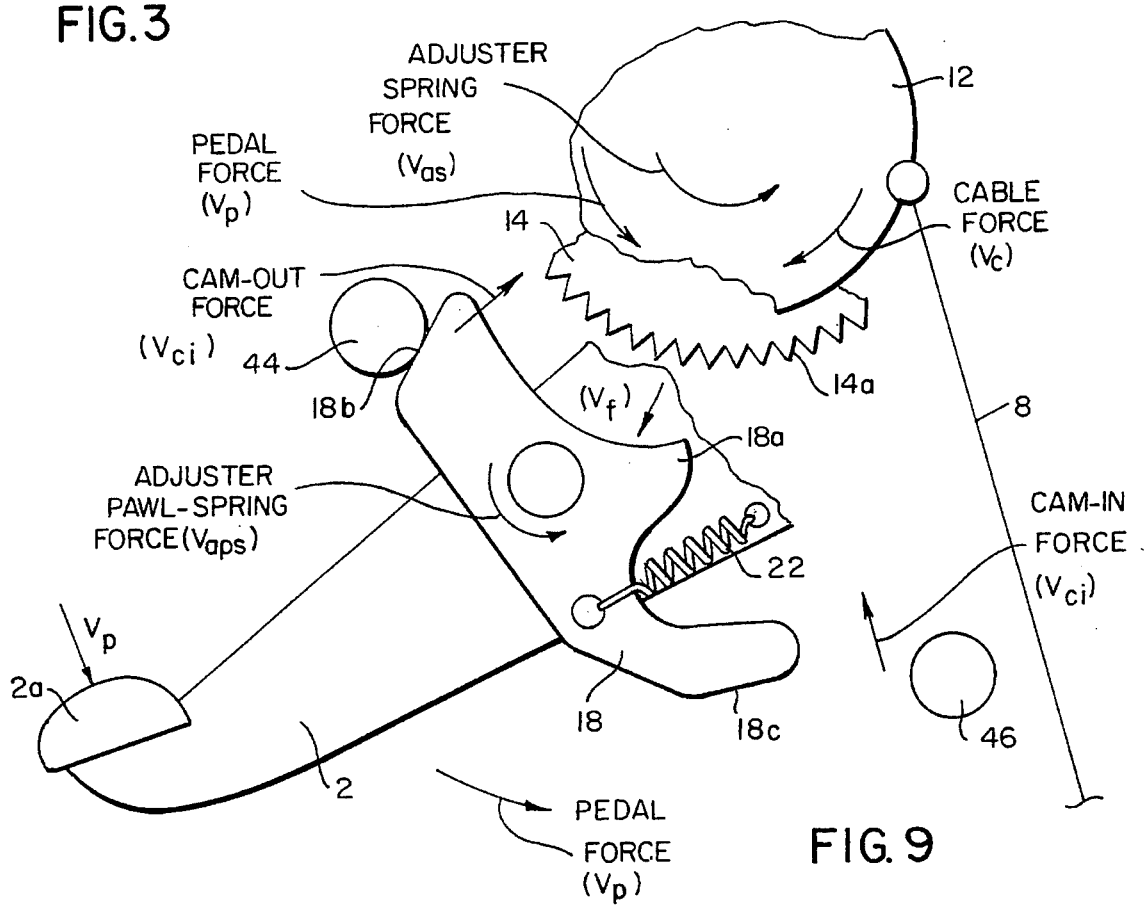
FIG. 9 is a diagrammatic view of the force vectors acting on the components of FIG. 5.
Figure 6:
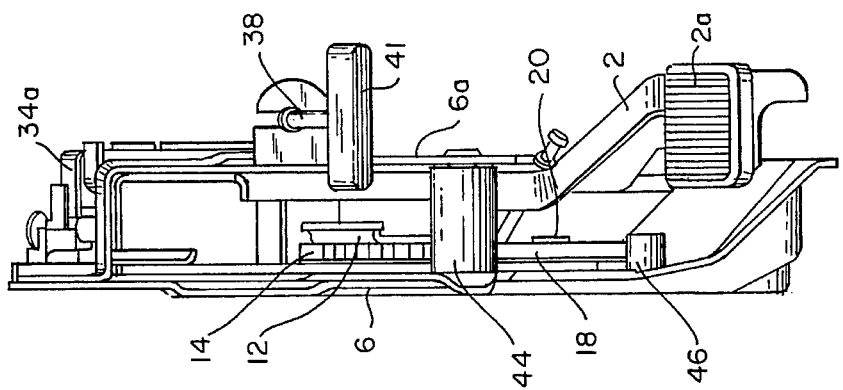
FIGS. 5 and 6 are right side elevation and left hand end views, respectively, of a foot lever parking brake arrangement according to the present invention.
Figure 10:
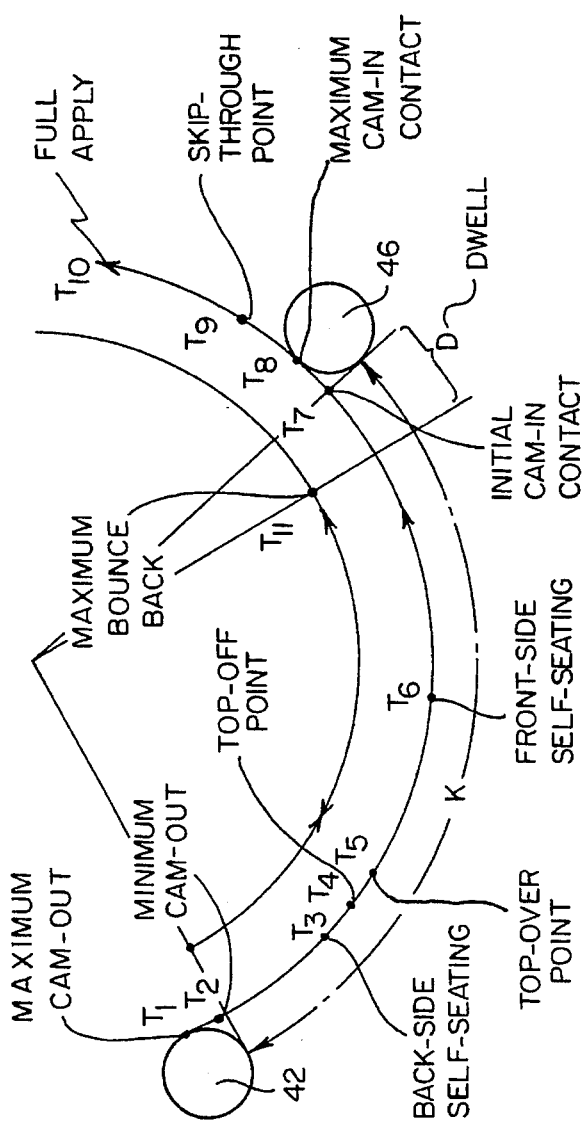
FIG. 10 is a diagrammatic illustration of the operation of the adjuster pawl of FIGS. 5 and 9 relative to the adjuster ratchet during travel of the lever of the parking Brake apparatus of FIG. 5.
Figure 15:
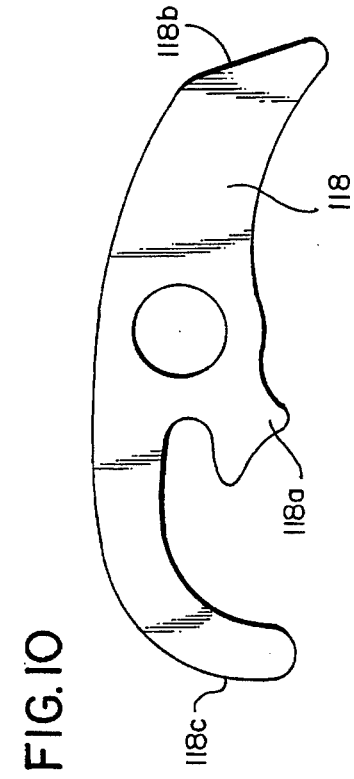
FIG. 15 shows an adjuster pawl of the second embodiment in FIGS. 11 and 12.

Referring now to FIGS. 9 and 10, assuming that the parking brake mechanism is initially in the fully-released condition, upon the application of force to foot pedal 2a, lever 2 is pivoted in the counterclockwise direction to tension the parking brake cable 8, and the cam-out edge 18b on adjuster pawl 18 is progressively removed from stationary camout pin 44 (i.e., during the first 3° to 5° of travel of the foot pedal, as shown by points $T_1$ and $T_2$ on the pedal travel curve). When contact with the cam-out pin ceases, the adjuster pawl pivots into one of the four possible engagement conditions of FIG. 1–4, depending on the instantaneous relationship between the adjuster pawl and ratchet. The point as which the self-adjust pawl cam-out surface disengages from the stationary component of a cam-out function initiates the timing overlap function of the engagement sequence. The reaction of the mechanism to the cam-in dwell timing overlap is dependent upon the type of engagement established during initial pedal travel, i.e. fully engaged, tip-on-tip or top-on-top condition.

If full engagement of the pawl tooth were to occur (FIG. 4), travel of the pedal 2 would be transmitted directly to cable 8 via pawl 18, ratchet 14, and cable track member 12. Owing to the known one-way operation of clutch spring 30 on drum 28, return movement of the pedal in the clockwise brake-releasing direction is prevented.

In the event that a rear edge tip-on-tip condition is obtained with the corresponding ratchet tooth (point 3 on the travel curve), the low-lever frictional force $V_f$ between the pawl and the tip-on-tip portion (4c in FIG. 3) is sufficient to carry the load as the pedal is further displaced toward the initial cam-in contact point $T_7$, wherein cam-in surface 18c engages the cam-in pin 46, and the low-level tooth-on-tooth frictional force $V_f$ is overcome by the sum of the adjuster pawl spring force $V_{aps}$ and the cam-in force $V_{ci}$.

In the event that a top-on-top (point $T_4$) or a front edge tip-on-tip condition (point $T_5$) is obtained between the pawl and ratchet teeth, during further movement of lever 2 in the brake-applying direction, the cable tension $V_c$ progressively increases relative to the constant frictional force $V_f$, the pedal force $V_p$, and the adjuster spring force $V_{as}$, whereupon when the sum of the cable tension $V_c$ and adjuster pawl spring force $V_{aps}$ exceeds that of the opposing forces, the pawl tooth is displaced toward the position (point $T_6$) at which the pawl is arranged for initial contact (point $T_7$) with the cam-in pin 46. The cam-in pin 46 then applies the force $V_{ci}$ to the cam-in edge 18b of adjuster pawl 18, whereupon the pawl tooth 18a is placed in the fully engaged condition of FIG. 4. Thus, the pawl is fully engaged with the ratchet prior to movement of the foot lever 2 to the skip-through point $T_9$, at which point the pawl might otherwise fail to enmesh fully with the ratchet teeth. The pedal continues to be depressed toward the brake fully applied condition, whereupon the lever 2 is maintained against pivotal movement in the opposite direction by the cooperation between clutch spring 30 and gear drum 28.

Upon release of the parking brake by pulling on the handle 41 of release lever 40, leg 30b of clutch spring 30 is displaced to expand the clutch spring turns relative to the periphery of drum 28, whereupon the foot lever 2 is pivoted by the tension of cable 8 toward the initial brake fully-released position. Cam-out pawl surface 18a engages cam-out pin 44 to pivot pawl 18 in the clockwise direction, thereby to disengage the adjuster pawl tooth 18a from the ratchet teeth 14a. Spiral adjuster spring 16 then expands to rotate the cable track member 12 and ratchet 14 in the counterclockwise direction, thereby to remove slack from cable 8. The adjuster pawl normally remains disengaged until the reapplication of force to the brake pedal 2a.

In the event that the cable tension is relatively great, and/or the material of the cam-out pin/bumper 44 is relatively resilient, a bounce-back condition may occur during which the lever 2 bounces back to the maximum bounce-back point 11 of FIG. 10, whereupon the pawl cam-out surface 18a is disengaged from cam-out pin 18a, and adjuster pawl 18 is pivoted by pawl spring 22 to effect engagement between pawl tooth 18a and an associated pair of ratchet teeth 14a.

Thus, in accordance with a characterizing feature of the present invention, the spacing distance of the cam-in pin 46 from cam-out pin 44 is critical to applicant's desired adjuster operation. More particularly, the spacing distance K of FIG. 10 must be at least as great as the distance between the minimum cam-out point $T_2$ and the top-off point 4, and preferably greater than the distance between the minimum cam-out point $T_2$ and the maximum bounce back distance D is provided between maximum bounce back position $T_{11}$ and minimum cam-in position $T_7$.

Figure 7:
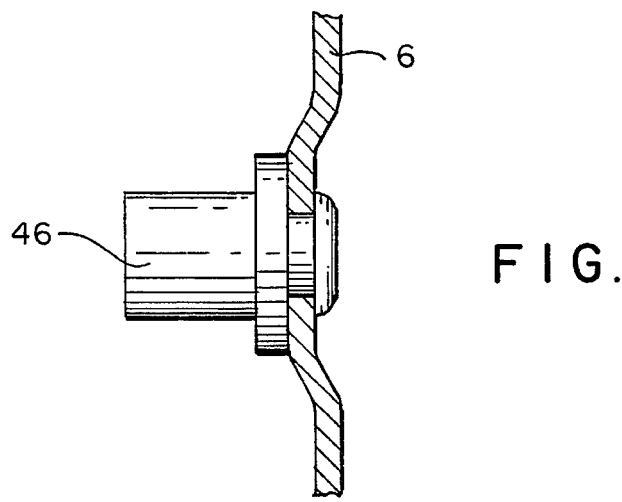
FIGS. 7 and 8 are sectional views taken along lines 7—7 and 8—8, respectively, of FIG. 5.
Figure 8:
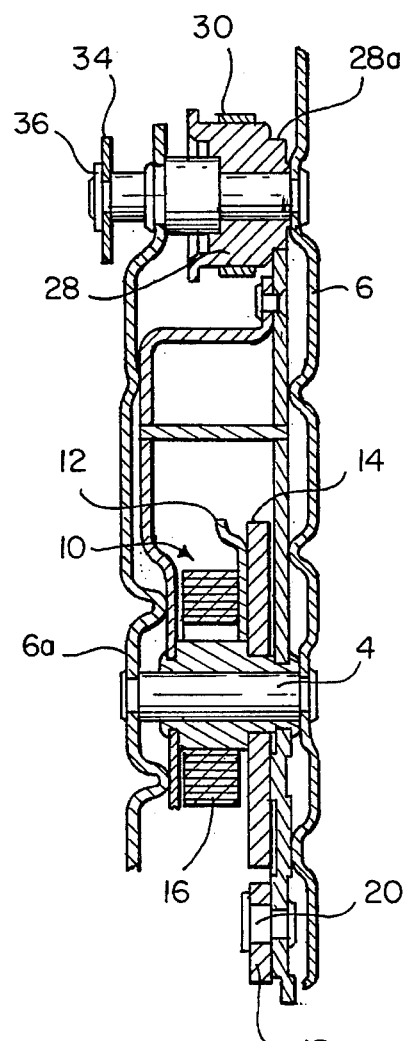
Figure 12:
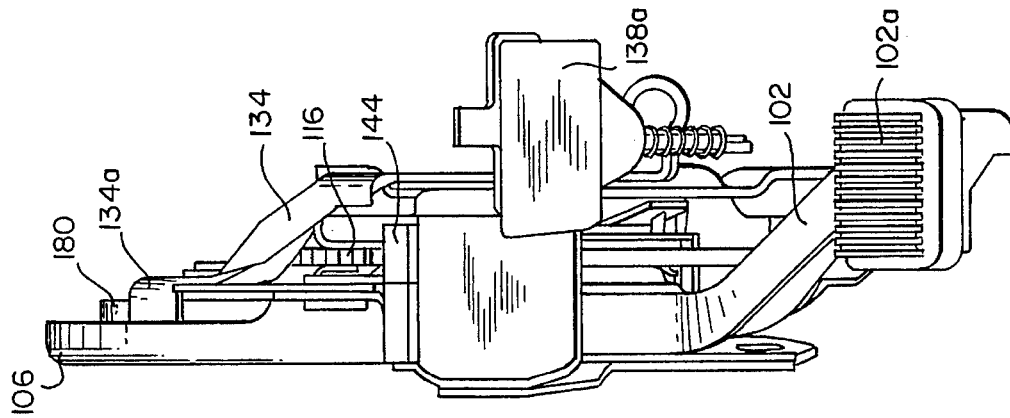

Of course, the dimensions have been greatly exaggerated in FIGS. 3 and 10 for purposes of explanation. In actual practice, the distance 5e in FIG. 1 is on the order of 0.003 inch to 0.004 inch, the distance 5d is less than about 0.001 inch, and the distance 5c is about 0.004 to 0.005 inch. The angle of travel of foot-lever 2 between the brake fully-released and fully-applied positions is about 65°. The cam-in pin 46 is carried by the housing 6 as shown in FIG. 7, and the resilient bumper/cam-in pin 44 is mounted between the housing 6 and the fixed housing cover 6a.

Referring now to FIGS. 11–15, a second foot-lever-operated brake mechanism is disclosed in which the means for maintaining the foot lever 102 in the brake fully-engaged position 102a includes a main ratchet 126 connected with the lever 102, and a main pawl 180 biased in the ratchet-engaging direction by spring 182 for pivotal movement about fixed pivot pin 184 on the housing 106. Release rod 138 pivots release lever 134 about fixed pivot pin 184 to cause the lever extremity 134a to disengage the main pawl tooth 180a from the main ratchet teeth 188a of main ratchet 188 carried by foot lever 102.

Figure 14:
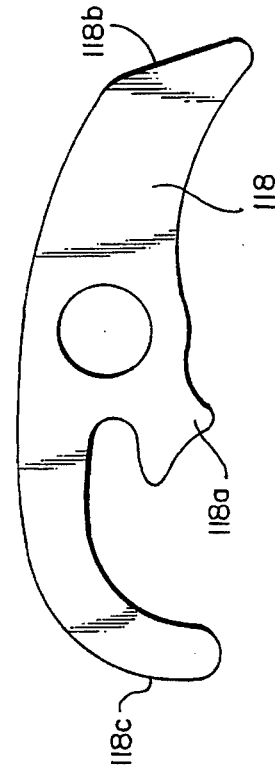

Adjuster pawl 118 is pivotally connected with foot lever 102 by fixed pivot pin 120, said pawl having a pawl tooth 118a (FIG. 15) which is normally biased into engagement with teeth 114a of adjuster ratchet 114 by adjuster pawl spring 119. The adjuster pawl 118 has a cam-out edge 118b for engaging the stationary resilient bumper 144 which also serves as a cam-out pin, and a cam-in edge 118c for engaging the cam-in pin 146 which is secured to housing 106, as shown in FIG. 14.

Figure 5:
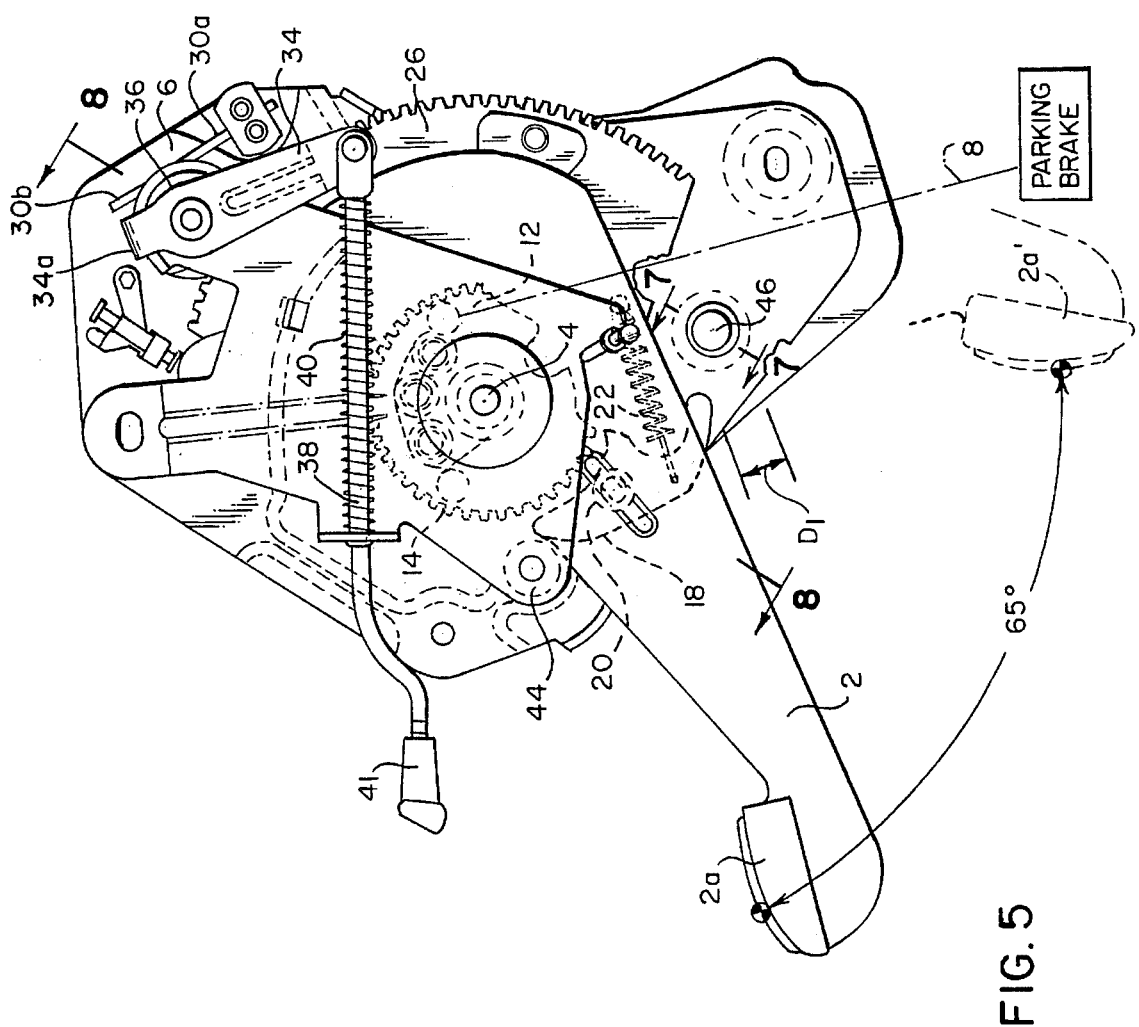

The operation of this foot lever embodiment is similar to that of the FIG. 5 embodiment. The spacing distance between the cam-out pin or bumper 144 and the cam-in pin 146 is greater than the distance between the minimum can-out point 2 of FIG. 10) and the maximum bounce back point (11 of FIG. 10), thereby to define the dwell distance $D_2$ shown in FIG. 11. In this embodiment, the angular displacement of foot lever 102 between the fully-released position and the fully-applied position is 79°.

Referring now to the hand lever embodiment of FIGS. 16–22, a single pin 247 serves as both the cam-out and cam-in pin for the adjuster pawl 218 which pivots about fixed pivot 220 on hand lever 202. Hand lever 202 pivots about pivot pin 204 mounted on housing 206, which hand lever is maintained in the brake-applied position by the cooperation between tooth 280a of main pawl 280 also pivoted on pivot pin 220, and the corresponding teeth of main ratchet 188 secured to the housing 206. As hand lever 202 is pivoted upwardly about main pivot pin 204 mounted between housing 206 and lever member 206a, adjuster pawl 218 is pivoted by adjuster pawl spring 222 in the clockwise direction to effect engagement between adjuster pawl tooth 218a and the corresponding teeth of adjuster ratchet 214. When the cam-in surface 218c of the adjuster pawl engages the cam-in side of the cam-in pain, the pawl 218 is pivoted into full enmeshing engagement with the adjuster ratchet 214. As the lever continues to be pivoted in the clockwise direction through 64° toward the brake fully-applied position, the brake cable 208 is tensioned to apply the parking brake, the lever being maintained in place by the cooperation between main pawl 280 and main ratchet or sector 288.

To release the parking brake, button 290 is inserted to pivot main pawl 280 in the clockwise direction about pivot 220, thereby to disengage main pawl tooth 280a from the teeth of main ratchet 288. Owing to the tension of brake cable 208, the cable track member 212, adjuster ratchet 214 and adjuster pawl 218 are displaced until the lever returns to its initial brake off position, whereupon cam-out surface 218b on the adjuster pawl 218 engages the cam-out side of pin 247, thereby to disengage adjuster pawl 218, whereupon adjuster spring 216 expands to remove slack from brake cable 208.

It is important to note that the effective distance between the cam-out and cam-in surfaces on the pawl relative to pin 247 is such as to provide a sufficient dwell overlap distance $D_3$ between the top-off position and the initial cam-in position as to insure that the cable tension has prevented any possibility of the adjuster pawl tooth 218a being in a top-on-top or front ends tip-on-tip position relative to the associated adjuster ratchet tooth.

It should be mentioned that the bounce-back travel of the lever (from $T_2$ to $T_{11}$ in FIG. 10) cannot exceed the lever travel distance to skip-through (i.e., from point $T_2$ to point $T_9$.

While in accordance with the provisions of the Patent Statutes the preferred forms and embodiments of the invention have been illustrated and described, it will be apparent that changes may be made without deviating from the inventive concepts set forth above.

What is claimed is:

1. A parking brake system of the self-adjust type for automatically removing slack from a parking brake cable, comprising:

(a) a housing (6, 106, 206);

(b) an operating lever (2, 102, 202) pivotally connected with said housing for movement between brake-released and brake-engaged positions;

(c) means (28,30; 180,188; 280,288) for releasably maintaining said lever in said brake-engaged position relative to said housing; and (d) self-adjust means for releasably connecting said cable with said lever so that cable tension is progressively increased as said lever is pivoted in the brake-applying direction, including:

(1) a cable track member (12, 112, 212) rotatably connected with said housing, said cable track member being adapted for connection with one end of the parking brake cable;

(2) an adjuster ratchet (14, 114, 214) connected with said cable track member said adjuster ratchet having a plurality of ratchet teeth;

(3) an adjuster pawl (18, 118, 218) pivotally connected with said lever, said adjuster pawl having a pawl tooth adapted for engagement with corresponding teeth on said ratchet in one of full engagement, partial tip-to-tip engagement, and non-load bearing top-on-top conditions, respectively;

(4) adjuster spring means (16, 116, 216) normally rotatably biasing said cable track member in the cable-slack-removing direction relative to said housing;

(5) cam-out means (44, 144, 47) mounted on said housing for pivoting said adjuster pawl to disengage the tooth thereof from said adjuster ratchet teeth when said operating lever is in the brake-disengaged position; and (6) cam-in means (46, 146; 47, 218c) for pivoting said adjuster pawl toward a fully-engaged position relative to said adjuster ratchet, said cam-in means being spaced from said cam-out means a distance greater than the distance between said cam-out means and the point of travel $T_4$ of said lever at which the force vector ($V_c$) produced by the progressively increasing cable tension exceeds the sum of the opposing adjuster spring force ($V_{as}$) and the pedal force ($V_p$), thereby to effect slight displacement of said adjuster pawl relative to said adjuster ratchet, whereby the occurrence of a tip-on-tip condition at the time of cam-in operation is prevented.

2. Apparatus as defined in claim 1, wherein said spacing distance between said cam-out means and said cam-in means is greater than the maximum amount of bounce-back travel ($T_{11}$) by said lever from said cam-in means upon release of cable tension from said lever.

3. Apparatus as defined in claim 2, wherein said lever is a foot-operated lever, (2, 102).

4. Apparatus as defined in claim 3, wherein said releasable retaining means comprises spring clutch and gear drum means (28, 30).

5. Apparatus as defined in claim 3, wherein said releasable retaining means comprises main pawl and ratchet means (180, 188).

6. Apparatus as defined in claim 2, wherein said cam-out means and said cam-in means comprise a pair of spaced cam pins mounted on said housing.

7. Apparatus as defined in claim 6, wherein said adjuster pawl is pivotally connected intermediate its ends with said lever, and further wherein said adjuster pawl includes at its ends cam-out and cam-in surfaces for engagement with said pins, respectively, during travel of said lever between said brake-engaged and brake-disengaged positions.

8. Apparatus as defined in claim 1, wherein said lever is a hand-operated lever (202).

9. Apparatus as defined in claim 8 wherein said releasable maintaining means comprises main pawl and ratchet means (280, 288).

10. Apparatus as defined in claim 8, wherein said cam-in means and said cam-out means includes a pair of opposed spaced cam surfaces (218b, 218c) on said adjuster pawl, and a cam pin (47) mounted on said housing between said cam surfaces.

* * * * *